US012725726B2

(12) United States Patent
Iwabuchi et al.

(10) Patent No.: US 12,725,726 B2
(45) Date of Patent: Sep. 1, 2026

(54) INDUCTOR

(71) Applicant: Panasonic Intellectual Property Management Co., Ltd., Osaka (JP)

(72) Inventors: Toru Iwabuchi, Osaka (JP); Hitoshi Horiuchi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 860 days.

(21) Appl. No.: 17/913,823

(22) PCT Filed: Mar. 12, 2021

(86) PCT No.: PCT/JP2021/010100

§ 371 (c)(1),
(2) Date: Sep. 22, 2022

(87) PCT Pub. No.: WO2021/200039

PCT Pub. Date: Oct. 7, 2021

(65) Prior Publication Data

US 2024/0212911 A1 Jun. 27, 2024

(30) Foreign Application Priority Data

Mar. 30, 2020 (JP) ................................ 2020-060325

(51) Int. Cl.
*H01F 27/28* (2006.01)
*H01F 27/255* (2006.01)

(52) U.S. Cl.
CPC ........... *H01F 27/255* (2013.01); *H01F 27/28* (2013.01)

(58) Field of Classification Search
CPC .. H01F 27/255; H01F 27/28; H01F 2017/048; H01F 1/26; H01F 17/04
USPC .................................. 336/83, 212, 233–234
See application file for complete search history.

(56) References Cited

U.S. PATENT DOCUMENTS

2002/0097124 A1* 7/2002 Inoue .................... H01F 27/027 336/83
2014/0218147 A1* 8/2014 Chatani ................... H01F 27/22 336/20

FOREIGN PATENT DOCUMENTS

JP 2013051399 A * 3/2013
JP 2015-106593 A 6/2015
JP 2015-164173 A 9/2015
JP 2016-106436 A 6/2016

OTHER PUBLICATIONS

International Search Report issued on Jun. 8, 2021 in International Patent Application No. PCT/JP2021/010100, with English translation.

* cited by examiner

*Primary Examiner* — Tuyen T Nguyen
(74) *Attorney, Agent, or Firm* — Rimon P.C.

(57) ABSTRACT

The inductor includes: a magnetic core member comprising metal magnetic material powder and resin; and a coil member which is a conductor, and has one part embedded inside the magnetic core member and an other part exposed outside the magnetic core member, wherein the magnetic core member has: a filling rate of the metal magnetic material powder of at least 73.5% by volume and at most 80.4% by volume; and a Young's modulus of at least 5.0 GPa and at most 10.5 GPa.

2 Claims, 8 Drawing Sheets

FIG. 6

| No. | | Resins | | | Metal magnetic material powder filling rate [vol%] | Magnetic permeability | Young's modulus [GPa] | Strength [N/mm²] | Crack OK/NG |
|---|---|---|---|---|---|---|---|---|---|
| | | First resin [wt%] | Second resin [wt%] | Total resins [wt%] | | | | | |
| 1 | * | 0.00 | 2.50 | 2.50 | 83.9 | 27.7 | 22.2 | 18.8 | NG |
| 2 | * | 0.00 | 2.80 | 2.80 | 80.8 | 26.1 | 23.8 | 19.8 | NG |
| 3 | * | 0.00 | 3.00 | 3.00 | 77.7 | 25.4 | 25.1 | 22.3 | NG |
| 4 | * | 0.00 | 3.40 | 3.40 | 72.0 | 22.7 | 24.9 | 24.1 | OK |
| 5 | * | 0.50 | 2.50 | 3.00 | 82.7 | 27.3 | 9.2 | 20.1 | NG |
| 6 | | 0.50 | 2.80 | 3.30 | 80.4 | 26.1 | 9.7 | 21.4 | OK |
| 7 | | 0.50 | 3.00 | 3.50 | 77.4 | 25.2 | 9.9 | 22.9 | OK |
| 8 | | 0.50 | 3.25 | 3.75 | 75.8 | 24.9 | 10.0 | 24.7 | OK |
| 9 | | 0.50 | 3.40 | 3.90 | 75.2 | 24.4 | 10.3 | 23.9 | OK |
| 10 | * | 0.10 | 3.00 | 3.10 | 79.8 | 25.7 | 18.5 | 22.4 | NG |
| 11 | | 0.25 | 3.00 | 3.25 | 78.9 | 25.5 | 10.5 | 22.8 | OK |
| 12 | | 1.00 | 3.00 | 4.00 | 77.3 | 25.1 | 7.8 | 22.9 | OK |
| 13 | | 2.00 | 3.00 | 5.00 | 73.5 | 23.3 | 5.0 | 22.4 | OK |
| 14 | * | 3.00 | 3.00 | 6.00 | 67.5 | 19.9 | 3.5 | 22.3 | OK |

INDUCTOR

CROSS-REFERENCE OF RELATED APPLICATIONS

This application is the U.S. National Phase under 35 U.S.C. § 371 of International Patent Application No. PCT/JP2021/010100, filed on Mar. 12, 2021, which in turn claims the benefit of Japanese Patent Application No. 2020-060325, filed on Mar. 30, 2020, the entire disclosures of which applications are incorporated by reference herein.

TECHNICAL FIELD

This disclosure relates to an inductor used in various electronic equipment.

BACKGROUND ART

Conventionally, an inductor has been introduced into a wide range of electronic equipment such as a DC-DC converter device for the purpose of raising and lowering the power supply voltage, smoothing the DC current, and the like. As the conventional inductor described above, for example, a powder-compacted inductor including: a powder-compacted magnetic core obtained by pressure-molding a mixture of a metal magnetic material powder and a resin; and a coil member in which a conducting wire is embedded in the powder-compacted magnetic core with the conducting wire wound and having a lead portion extending outside the powder-compacted magnetic core, is known (see Patent Literature (PTL) 1).

CITATION LIST

Patent Literature

[PTL 1] Japanese Unexamined Patent Application Publication No. 2016-106436

SUMMARY OF INVENTION

Technical Problem

Incidentally, the conventional inductor such as the powder-compacted inductor r disclosed in PTL 1 described above may not be suitable for use. In view of the above, it is an object of the present disclosure to provide an inductor that is more suitable for use.

Solution to Problem

The inductor according to one aspect of the present disclosure includes: a magnetic core member comprising metal magnetic material powder and resin; and a coil member which is a conductor, and has one part embedded inside the magnetic core member and an other part exposed outside the magnetic core member, wherein the magnetic core member has: a filling rate of the metal magnetic material powder of at least 73.5% by volume and at most 80.4% by volume; and a Young's modulus of at least 5.0 GPa and at most 10.5 GPa.

Advantageous Effects of Invention

According to the present disclosure, an inductor more suitable for use is provided.

BRIEF DESCRIPTION OF DRAWINGS

FIG. 6 is a diagram showing the relationship between the resin composition and the physical properties of the inductor according to the embodiment.

Figure 1:
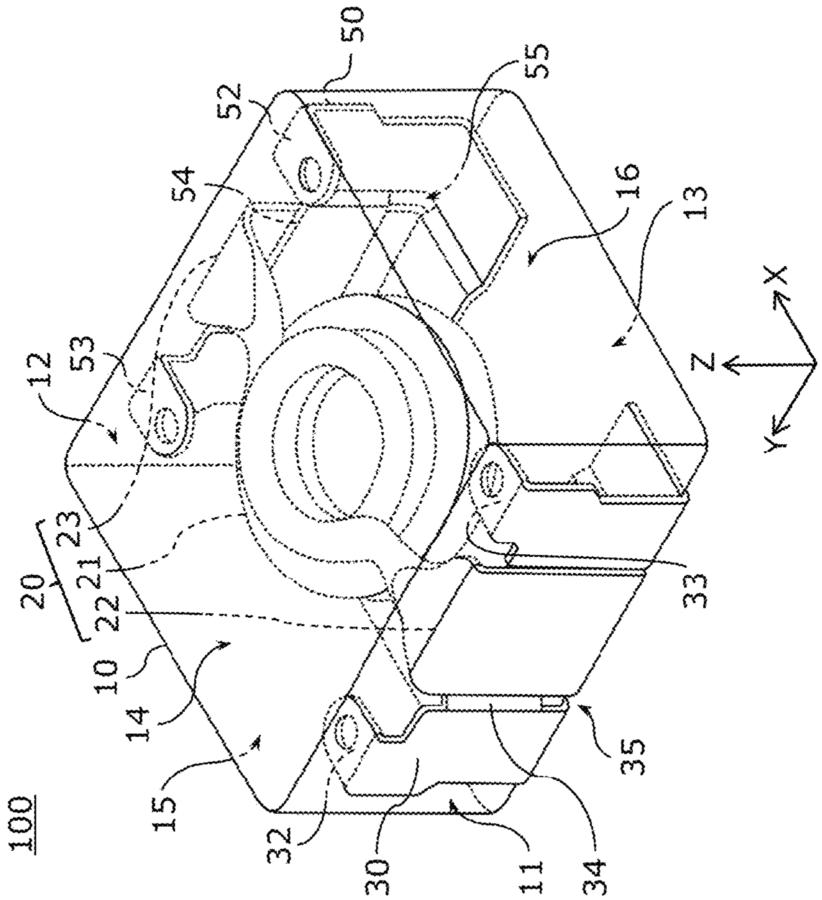
FIG. 1 is a schematic perspective view showing a configuration of an inductor according to an embodiment.

DESCRIPTION OF EMBODIMENTS (Underlying Knowledge Leading to the Disclosure)

Conventionally, an inductor has been introduced into a wide range of electronic equipment such as a DC-DC converter device for the purpose of raising and lowering the power supply voltage, smoothing the DC current, and the like. As a configuration of the inductor, for example, a powder-compacted inductor including: a magnetic core member obtained by pressure-molding a mixture of a metal magnetic material powder and a resin; and a coil member in which a conducting wire is embedded in the powder-compacted magnetic core with the conducting wire wound and having a lead portion extending outside the powder-compacted magnetic core, is known.

Here, for example, in such a case or the like that a large voltage is applied to the inductor, a coil member using a conducting wire having a large cross-sectional area (for example, which is thick) may be selected. In the inductor manufacturing step, an external force applied for processing the coil member generates a load on the magnetic core member covering the coil member. When a conducting wire having a large cross-sectional area is used as described above, such a load becomes remarkable, and in some cases, cracks are generated in the magnetic core member, which causes a problem that an inductor unsuitable for use may be formed, or the like.

In order to suppress the generation of such cracks, for example, a means for increasing the addition amount of the resin included in the magnetic core member is used, but the increase in the addition amount of the resin reduces the addition amount of the metal magnetic material powder included in the magnetic core member. Therefore, in order to suppress the generation of cracks in the magnetic core member, the metal magnetic material powder is reduced, and the magnetic permeability is lowered. That is, it had been difficult to achieve both suppression of the generation of cracks and maintenance of high magnetic permeability at the same time.

Then, in the present disclosure, by using a highly elastic resin as the resin included in the magnetic core member, the generation of cracks in the magnetic core member is suppressed, and an inductor more suitable for use is provided.

Hereinafter, embodiments will be specifically described with reference to the drawings.

It should be noted that all of the embodiments described below show a specific example of the present disclosure. The numerical values, shapes, materials, components, arrangement positions of the components, connection forms, steps, the order of steps, and the like shown in the following embodiments are examples, and are not intended to limit the present disclosure. In addition, among the components in the following embodiments, the components not described in the independent claim are described as arbitrary components.

In addition, each figure shows an X-axis, a Y-axis, and a Z-axis which mean three directions orthogonal to each other, and these axes are used for explanation, as necessary. Each axis is provided for illustration purposes only and does not limit the direction and orientation in which the inductor is used.

Embodiment (Configuration)

First, the inductor according to the embodiment of the present disclosure will be described with reference to FIG. 1. FIG. 1 is a schematic perspective view showing a configuration of an inductor according to an embodiment. FIG. 1 shows an approximate shape of magnetic core member 10 described later, which is further shown through the inside of magnetic core member 10. For example, the components such as coil member 20 hidden by being embedded in magnetic core member 10 are shown by broken lines, and represent that they can be seen through magnetic core member 10.

As shown in FIG. 1, inductor 100 of the present embodiment includes: magnetic core member 10; coil member 20 which is a conductor, and has one part embedded inside magnetic core member 10 and an other part exposed outside magnetic core member 10; and a pair of terminal members electrically connected to coil member 20. Specifically, the pair of terminal members are first terminal member 30 and second terminal member 50, and the details will be described later.

Magnetic core member 10 is a molded body obtained by pressure-molding a mixture of metal magnetic material powder 40 (see FIG. 3 described later) and resin 41 (see FIG. 3 described later), and is a magnetic material called a powder magnetic core. As shown in FIG. 1, magnetic core member 10 substantially matches the approximate shape of inductor 100, in other words, inductor 100 having an arbitrary shape can be realized depending on the shape of magnetic core member 10 at the time of pressure-molding. That is, the shape of inductor 100 is not particularly limited, and the contents of the present disclosure can be applied to inductors having any three-dimensional shape such as a cylinder or a polygonal prism, in addition to the quadrangular prism shape exemplified in the present embodiment.

Magnetic core member 10 is a substantially quadrangular prism in shape including first terminal surface 11, second terminal surface 12, bottom surface 13, top surface 14, side surface 15, and side surface 16. First terminal surface 11 and second terminal surface 12 face each other and are substantially rectangular in shape having the same dimensions. Each of the pair of terminal members is arranged on first terminal surface 11 and second terminal surface 12, respectively. In the figure, first terminal surface 11 is the X-axis minus side surface of inductor 100, and second terminal surface 12 is the X-axis plus side surface of inductor 100.

Bottom surface 13, top surface 14, side surface 15, and side surface 16 are rectangular surfaces that connect the corresponding sides of first terminal surface 11 and second terminal surface 12, respectively. In the figure, bottom surface 13 is the Z-axis minus side surface of inductor 100, and top surface 14 is the Z-axis plus side surface of inductor 100. In addition, in the figure, side surface 15 is the Y-axis plus side surface of inductor 100, and side surface 16 is the Y-axis minus side surface of inductor 100. As an example, inductor 100 in the present embodiment is s substantially quadrangular in shape in which the dimensions of bottom surface 13 and top surface 14 are 14.0 mm×12.5 mm and the separation distance between bottom surface 13 and top surface 14 is 8.0 mm.

Coil member 20 has winding portion 21 in which a conducting wire having an insulating film is wound and formed, and a pair of lead portions connected to both end portions of winding portion 21, respectively. Specifically, the pair of lead portions are first lead portion 22 extending from winding portion 21 toward first terminal surface 11 and second lead portion 23 extending from winding portion 21 toward second terminal surface 12. In the present embodiment, coil member 20 is configured by using a round conducting wire having a cross-sectional diameter of 0.65 mm as the conducting wire. It should be noted that the conducting wire used for coil member 20 is not limited to the round conducting wire described above, and a flat conducting wire having a rectangular cross section may be used.

Winding portion 21 is embedded inside magnetic core member 10, and a magnetic field is formed in winding portion 21 by applying a voltage between first lead portion 22 and second lead portion 23. By forming a magnetic field by winding portion 21, inductor 100 functions as a passive element that stores electrical energy as magnetic energy.

First lead portion 22 further extends from first terminal surface 11 to the outside of magnetic core member 10. In addition, first lead portion 22 has a stretched plate shape. In first lead portion 22, the insulating film of the conducting wire is removed, and it is possible to electrically connect to the outside. First lead portion 22 is bent at a portion extending to the outside of magnetic core member 10, and extends to the Z axis negative side along first terminal surface 11.

Second lead portion 23 further extends from second terminal surface 12 to the outside of magnetic core member 10. In addition, second lead portion 23 has a stretched plate shape. In second lead portion 23, the insulating film of the conducting wire is removed, and it is possible to electrically connect to the outside. Second lead portion 23 is bent at a portion extending to the outside of magnetic core member 10, and extends to the Z axis negative side along second terminal surface 12.

First terminal member 30 and second terminal member 50 are composed of conductors such as phosphor bronze material and copper material, and are plate-shaped members along first terminal surface 11. First terminal member 30 includes protrusions 32 and 33 protruding toward magnetic core member 10. Protrusions 32 and 33 are embedded in magnetic core member 10, and first terminal member 30 is fixed to magnetic core member 10. In addition, first terminal member 30 has recess 34 which is recessed from first terminal surface 11 into the inner side of magnetic core member 10 and has a bottom surface parallel to first terminal surface 11 formed. First lead portion 22 is bent and arranged in recess 34 so that the extended plate surface of first lead portion 22 and the bottom surface of recess 34 are in surface contact with each other. First lead portion 22 is arranged in recess 34 and is connected to first terminal member 30 by resistance welding or the like, and is fixed to first terminal member 30.

Second terminal member 50 includes protrusions 52 and 53 protruding toward magnetic core member 10. Protrusions 52 and 53 are embedded in magnetic core member 10, and second terminal member 50 is fixed to magnetic core member 10. In addition, second terminal member 50 has recess 54 which is recessed from second terminal surface 12 into the inner side of magnetic core member 10 and has a bottom surface parallel to second terminal surface 12 formed. Second lead portion 23 is bent and arranged in recess 54 so that the extended plate surface of second lead portion 23 and the bottom surface of recess 54 are in surface contact with each other. Second lead portion 23 is arranged in recess 54 and is connected to second terminal member 50 by resistance welding or the like, and is fixed to second terminal member 50.

In addition, first terminal member 30 and first lead portion 22 are bent along first terminal surface 11 and bottom surface 13 of magnetic core member 10. Similarly, second terminal member 50 and second lead portion 23 are bent along second terminal surface 12 and bottom surface 13 of magnetic core member 10. At this time, first terminal member 30 is provided with through hole 35 in advance in the ridgeline portion of first terminal surface 11 and bottom surface 13 so that the bending of first terminal member 30 is not hindered by a level difference between the surface along first terminal surface 11 and bottom surface 13 and the bottom surface of recess 34. Similarly, second terminal member 50 is provided with through hole 55 in advance in the ridgeline portion of second terminal surface 12 and bottom surface 13 so that bending is not hindered by a level difference between the surface along second terminal surface 12 and bottom surface 13 and the bottom surface of recess 54.

In this way, first lead portion 22 and second lead portion 23 of coil member 20 are arranged on bottom surface 13 of inductor 100 while being held by first terminal member 30 and second terminal member 50. Accordingly, first lead portion 22 and second lead portion 23 are configured so as to be directly connected to the land (not shown) of the mounting board. It should be noted that in the present embodiment, first terminal member 30 and second terminal member 50 are not indispensable features, and first terminal member 30 and second terminal member 50 may not be used if first lead portion 22 and second lead portion 23 have the strength to maintain the shape independently.

Figure 2A:
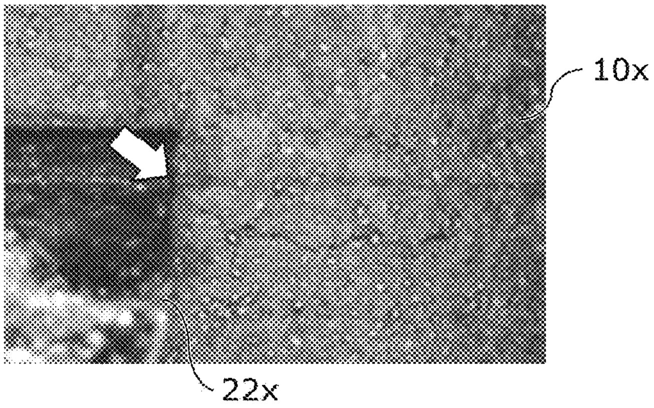
FIG. 2A Prior Art
FIG. 2A is a diagram showing a side surface of a conventional inductor.
Figure 2B:
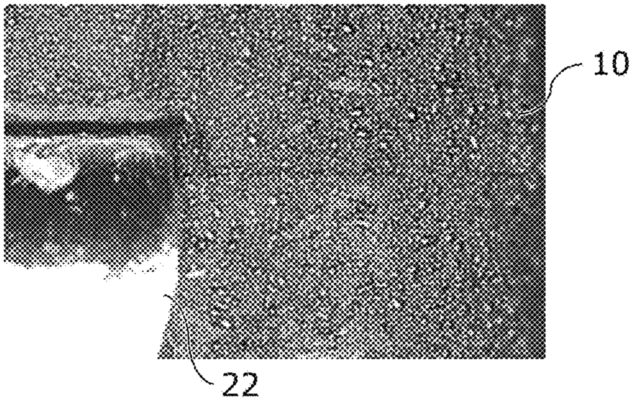
FIG. 2B is a diagram showing a side surface of the inductor according to the embodiment.

Here, an inductor that is not suitable for use due to the susceptibility to crack generation, which has been mentioned as a problem in the present disclosure, will be described with reference to FIG. 2A and FIG. 2B. FIG. 2A is a plan view of a conventional inductor. FIG. 2A shows a plan view of magnetic core member 10$x$ of the conventional inductor in a surface corresponding to first terminal surface 11 (that is, viewed from the X-axis minus side in the inductor in the orientation of FIG. 1). In addition, FIG. 2B is a plan view of the inductor according to the embodiment. FIG. 2B shows a view of magnetic core member 10 of inductor 100 in the embodiment as viewed from the same viewpoint as in FIG. 2A.

As shown in FIG. 2A, in the conventional inductor, for example, when lead portion 22$x$ corresponding to first lead portion 22 is bent along a surface corresponding to first terminal surface 11, magnetic core member 10$x$ cannot withstand the bending stress, and a crack (a white arrow in the figure) occurs. In particular, such a phenomenon is remarkably observed in such a case or the like that coil member 20 is configured by using a large-diameter conducting wire assuming a high voltage. In addition, such a crack may occur not only in the bending of lead portion 22$x$ but also in various processing steps for manufacturing the inductor.

Figure 3:
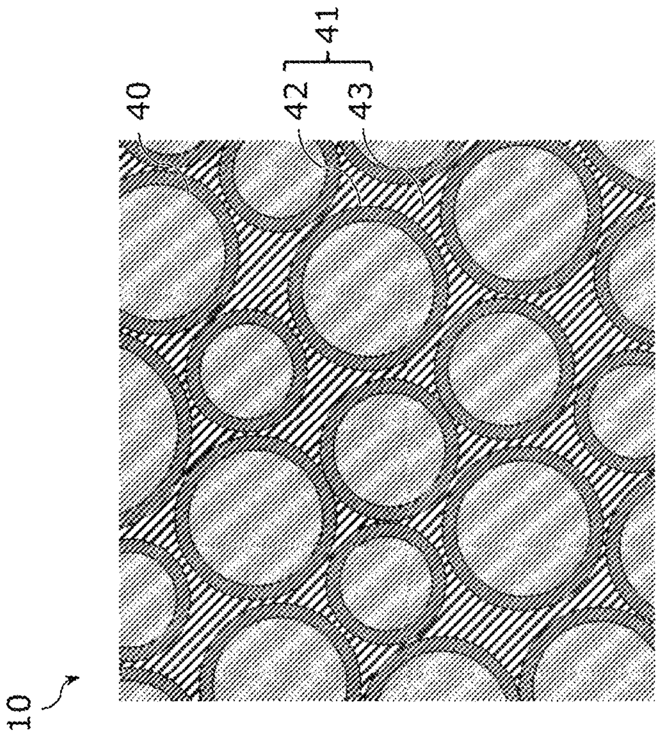
FIG. 3 is a first schematic view showing a cross section of a magnetic core member of the inductor according to the embodiment.
Figure 4:
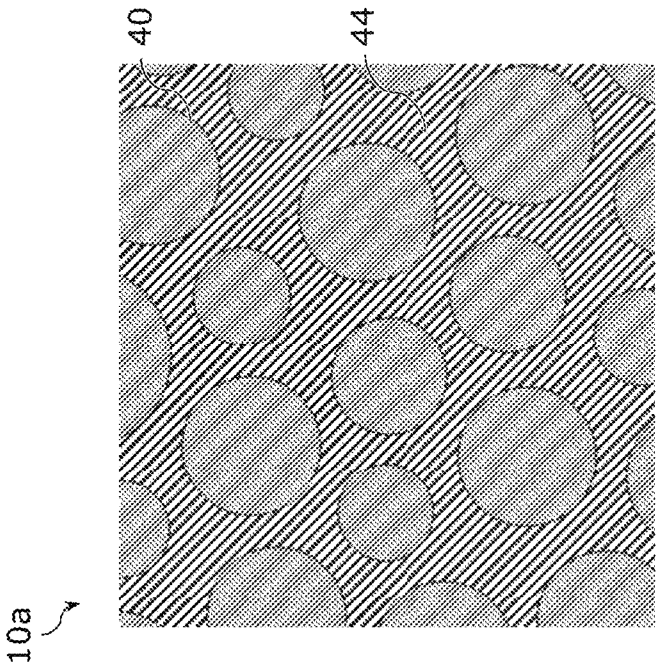
FIG. 4 is a second schematic view showing a cross section of a magnetic core member of the inductor according to the embodiment.

On the other hand, in inductor 100 of the present embodiment, the resin included in magnetic core member 10 is a highly elastic resin, so that even when first lead portion 22 is bent as shown in FIG. 2B, the generation of cracks in magnetic core member 10 is suppressed, and inductor 100 more suitable for use is realized. Hereinafter, the resin for configuring magnetic core member 10 in the present embodiment will be described with reference to FIG. 3 and FIG. 4. FIG. 3 is a first schematic view showing a cross section of a magnetic core member of the inductor according to the embodiment. In addition, FIG. 4 is a second schematic view showing a cross section of the magnetic core member of the inductor according to the embodiment.

As described above, magnetic core member 10 is a molded body obtained by pressure-molding a mixture of metal magnetic material powder 40 and resin 41. Coil member 20 is embedded in magnetic core member 10, and combines a function as a magnetic core in inductor 100 and a function as an exterior body that covers coil member 20 and determines the approximate shape of inductor 100.

As the metal composition of metal magnetic material powder 40, iron having a high saturation magnetic flux density among soft magnetic materials and a metal magnetic material including iron as a main component are used. Examples of the metal magnetic material include a metal magnetic material having a crystalline composition such as an iron-nickel alloy, an iron-silicon alloy, an iron-silicon-aluminum alloy, and an iron-silicon-chromium alloy, and a metal magnetic material having an amorphous composition such as iron-silicon-boron type and iron-silicon-boron-chromium type.

It should be noted that the metal composition of metal magnetic material powder 40 is not limited to the above, and a magnetic material powder having another metal composition may be used. In addition, the method for producing metal magnetic material powder 40 is not particularly limited, and examples thereof include various atomization methods and pulverizing methods using various pulverizing machines.

The average particle size of metal magnetic material powder 40 is preferably, for example, at least 5 μm and at most 30 μm. When the average particle size is at least 5 μm, the aggregation of the particles of metal magnetic material powder 40 is suppressed and the ease of molding is improved. In addition, when the average particle size is at most 30 μm, the eddy current loss generated in the particles of metal magnetic material powder 40 when inductor 100 is used in a high frequency region can be reduced. More preferably, the average particle size of metal magnetic material powder 40 may be at least 10 μm and at most 20 μm. With metal magnetic material powder 40 having such an average particle size, the above effect can be obtained more remarkably.

It should be noted that the average particle size of metal magnetic material powder 40 can be obtained by a laser diffraction type particle size distribution measurement method. For example, when the particle size of the particle to be measured shows the same pattern of diffracted/scattered light as a sphere having a diameter of 10 μm, the particle size of the particle to be measured is determined to be 10 μm regardless of the shape, and the same measurement is performed for a plurality of particles to be measured to create a particle size distribution. The median particle size in the created particle size distribution is calculated as the average particle size.

Resin 41 has a function of interposing between the particles of metal magnetic material powder 40 and binding the particles to each other to harden the molded body. In addition, it has a function of interposing between the particles of metal magnetic material powder 40 and suppressing the flow of eddy current between the particles.

As resin 41, for example, a thermosetting resin is used. The thermosetting resin is suitable for fixing the shape of magnetic core member 10 because it is easily cured by heat treatment after molding magnetic core member 10. In the present embodiment, as resin 41, resin 41 containing a silicone resin as a main component is used. Silicone resin has higher elasticity than inorganic water glass and organic epoxy resin or phenol resin. For this reason, magnetic core member 10 can be imparted with high elasticity characteristics, and when first terminal member 30 and second terminal member 50 and first lead portion 22 and second lead portion 23 are bent, the generation of cracks in magnetic core member 10 can be suppressed.

In addition, in the present embodiment, resin 41 is composed of a plurality of silicone resins including first resin 42 and second resin 43. First resin 42 and second resin 43 are both resins classified as silicone resins, but are silicone resins having different properties from each other. It should be noted that, resin 41 may contain another silicone resin, an additive, or the like in addition to first resin 42 and second resin 43.

First resin 42 is a silicone resin for improving the elasticity of magnetic core member 10. As first resin 42, a silicone resin containing substantially the same amount of D unit (bifunctional) and T unit (trifunctional) is used among the silicone resins. As such a silicone resin, for example, an adhesive silicone resin is used in the present embodiment. It should be noted that substantially the same amount is within a numerical range in which the elasticity of the silicone resin is considered to be equivalent to that of the adhesive silicone resin, and may include an error of, for example, about several percent to ten and several percent.

Second resin 43 binds the particles of metal magnetic material powder 40 to each other and maintains the shape of magnetic core member 10. As second resin 43, for example, a silicone resin containing a T unit (trifunctional) as a main component is used among the silicone resins. As such a silicone resin, for example, a pure silicone resin is used in the present embodiment, but a modified silicone resin such as epoxy-modified may be used.

As a method for producing magnetic core member 10, first, first resin 42 and an appropriate amount of solvent are mixed and kneaded. Next, kneaded first resin 42 and metal magnetic material powder 40 are mixed. They are mixed so that the amount of first resin 42 has a ratio of at least 0.25% by weight and at most 2.00% by weight with respect to the mass of metal magnetic material powder 40. It should be noted that as the solvent to be mixed with first resin 42, for example, isopropyl alcohol, toluene and the like are used.

Next, second resin 43 and an appropriate amount of solvent are mixed and kneaded. Kneaded second resin 43 is added to the mixture of first resin 42 and metal magnetic material powder 40 and mixed. They are mixed so that the amount of second resin 43 has a ratio of at least 2.80% by weight and at most 3.40% by weight with respect to the mass of metal magnetic material powder 40. As described above, a mixture of metal magnetic material powder 40, first resin 42, and second resin 43 is obtained. By mixing them in this order, each particle of metal magnetic material powder 40 is covered with first resin 42 and further dispersed in second resin 43 to be in the state shown in FIG. 3.

In addition, as a producing method different from the producing method of magnetic core member 10 described above, first resin 42 and second resin 43 may be mixed with metal magnetic material powder 40 at the same time. As shown in FIG. 4, in magnetic core member 10*a* produced by another producing method, a mixture in which metal magnetic material powder 40 is dispersed in third resin 44, which is a composite resin of first resin 42 and second resin 43, is obtained.

Next, the obtained mixture is dried to remove the solvent at the time when first resin 42 and second resin 43 are kneaded. Furthermore, the dried mixture is pulverized and sieved to obtain granular granulated powder having a particle size of 150 μm to 500 μm. Magnetic core member 10 is produced by pressure-molding the granulated powder.

It should be noted that in order to manufacture inductor 100, the obtained granulated powder is filled in a mold, winding portion 21 of coil member 20, protruding portions 32 and 33 of first terminal member 30 as well as protruding portions 52 and 53 of second terminal member 50 are arranged at predetermined positions, and pressure molding is performed with a pressing force of 300 MPa to 500 MPa. Inductor 100 is produced by thermally curing resin 41 by heat-treating the obtained molded body at 180° C. for 120 minutes.

Magnetic core member 10 produced as described above has a filling rate in which the volume of metal magnetic material powder 40 is at least 73.5% by volume and at most 80.4% by volume with respect to the volume of magnetic core member 10. Furthermore, produced magnetic core member 10 has elasticity with a Young's modulus of at least 5.0 GPa and at most 10.5 GPa.

For example, when the filling rate of metal magnetic material powder 40 is smaller than 73.5% by volume, the magnetic permeability of magnetic core member 10 becomes small (that is, the magnetic characteristics deteriorate). In addition, for example, when the filling rate of metal magnetic material powder 40 is larger than 80.4% by volume, the amount of resin 41 added is reduced and the strength of magnetic core member 10 is lowered. It should be noted that the filling rate of metal magnetic material powder 40 is more preferably in the range of at least 75.0% by volume and at most 80.0% by volume. Accordingly, the magnetic characteristics and strength of magnetic core member 10 can be further improved. It should be noted that the filling rate of metal magnetic material powder 40 is a volume ratio of metal magnetic material powder 40 to the sum of the volume of metal magnetic material powder 40 and the volume of resin 41.

In addition, as described above, magnetic core member 10 in the present embodiment has elasticity with a Young's modulus of at least 5.0 GPa and at most 10.5 GPa. Accordingly, when first terminal member 30 and second terminal member 50 as well as first lead portion 22 and second lead portion 23 are bent, the elasticity of magnetic core member 10 suppresses the generation of cracks in magnetic core member 10.

For example, when the Young's modulus is smaller than 5.0 GPa, the strain of magnetic core member 10 against external stress becomes large, and it becomes difficult to maintain the shape of magnetic core member 10. In addition, for example, when the Young's modulus is larger than 10.5 GPa, the effect of suppressing the generation of cracks in magnetic core member 10 is reduced.

By having both a filling rate of metal magnetic material powder 40 of at least 73.5% by volume and at most 80.4% by volume and a Young's modulus of at least 5.0 GPa and at most 10.5 GPa, magnetic core member 10 can suppress the generation of cracks while having excellent magnetic characteristics.

It should be noted that the Young's modulus means a characteristic value evaluated by the nanoindentation method standardized as an instrumentation indentation test of the international standard ISO14577.

In addition, the strength of magnetic core member 10 is preferably at least 21.4 $N/mm^2$ and at most 25.0 $N/mm^2$. By having both a Young's modulus of at least 5.0 GPa and at most 10.5 GPa and a strength of at least 21.4 $N/mm^2$ and at most 25.0 $N/mm^2$, magnetic core member 10 becomes sticky, the energy required to break magnetic core member 10 is increased, and the effect of suppressing the generation of cracks in magnetic core member 10 is further enhanced.

For example, when the strength is smaller than 21.4 $N/mm^2$, cracks may be generated in magnetic core member 10 due to the stress when first terminal member 30 and second terminal member 50 as well as first lead portion 22 and second lead portion 23 are bent from first terminal surface 11 or second terminal surface 12 side of magnetic core member 10 to bottom surface 13 side. In addition, the upper limit of the strength is not particularly limited, but for example, when the strength is made larger than 25.0 $N/mm^2$, it is generally necessary to increase the amount of resin 41 added, and it may lead to deterioration of the magnetic characteristics and a decrease in Young's modulus of magnetic core member 10.

Figure 5A:
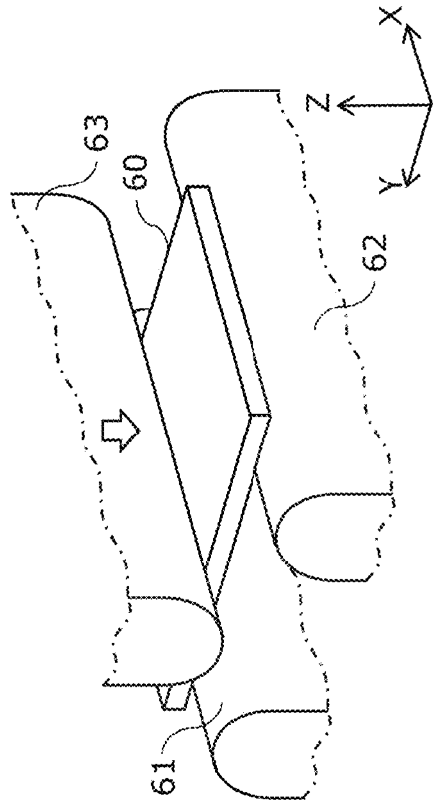
FIG. 5A is a first diagram illustrating the strength measurement of the magnetic core member of the inductor according to the embodiment.
Figure 5B:
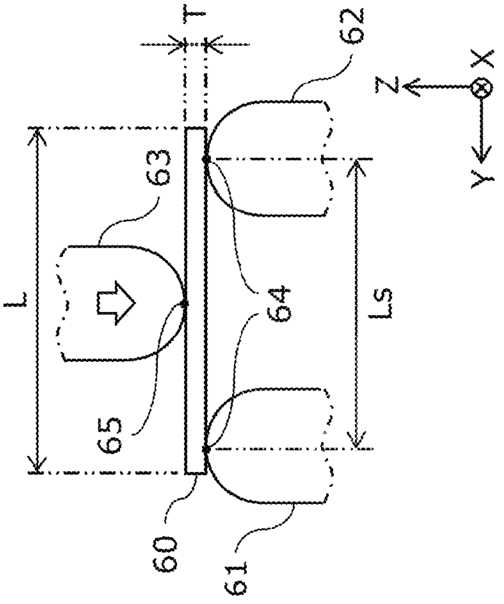
FIG. 5B is a second diagram illustrating the strength measurement of the magnetic core member of the inductor according to the embodiment.
Figure 5C:
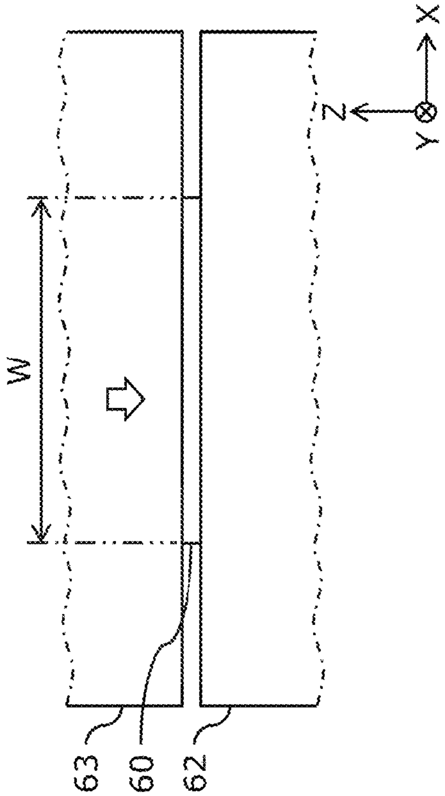
FIG. 5C is a third diagram illustrating the strength measurement of the magnetic core member of the inductor according to the embodiment.

It should be noted that the strength means the maximum bending stress when a test piece is placed on two fulcrums arranged apart from each other, a load is applied to one central point (hereinafter, also referred to as a load point) between the two fulcrums and the test piece breaks. Hereinafter, the strength measuring method described above will be specifically described with reference to FIG. 5A to FIG. 5C. FIG. 5A is a first diagram illustrating the strength measurement of the magnetic core member of the inductor according to the embodiment. In addition, FIG. 5B is a second diagram illustrating the strength measurement of the magnetic core member of the inductor according to the embodiment. In addition, FIG. 5C is a third diagram illustrating the strength measurement of the magnetic core member of the inductor according to the embodiment.

FIG. 5A is a perspective view showing a state at the time of measuring the strength of test piece 60. In addition, FIG. 5B is a front view showing a state at the time of measuring the strength of test piece 60. In addition, FIG. 5C is a side view showing a state at the time of measuring the strength of test piece 60.

As shown in the figure, test piece 60 is magnetic core member 10 produced to have length L of 12.0 mm, width W of 12.0 mm, and thickness T of 0.7 mm. In addition, magnetic core member 10 used as test piece 60 is pressure-molded to the above dimensions, and resin 41 is thermally cured by heat treatment. It should be noted that as test piece 60, a part of magnetic core member 10 cut out to have the above dimensions from the separately produced magnetic core member 10 may be used.

The test device includes support 61 and support 62 having fulcrum 64 corresponding to the above fulcrum, and indenter 63 having load point 65 corresponding to the above load point. It should be noted that support 61, support 62, and indenter 63 are all members longer than width W of test piece 60 (long in the X-axis direction). Support 61, support 62, and indenter 63 have a semi-cylindrical shape having a cross-sectional shape with a radius of curvature of 2.0 to 3.0 mm on the side in contact with test piece 60. The tips of the semi-cylinders of support 61 and support 62 serve as fulcrums 64 that support test piece 60 from below (Z-axis minus side). Distance Ls between the fulcrums, which is the distance between fulcrum 64 of support 61 and fulcrum 64 of support 62, is set to 10.0 mm. In addition, indenter 63 is arranged at the center (intermediate point in the Y-axis direction) of support 61 and support 62, and a load is applied to test piece 60 at load point 65 from above (Z-axis plus side).

Test piece 60 is placed on fulcrums 64 of support 61 and support 62, indenter 63 is displaced in the direction of the white arrow in the figure, a load is applied at a speed of 0.5 mm/min, and the load at the time when test piece 60 is broken is measured.

From this obtained measured value, strength σ ($N/mm^2$) is calculated by following equation 1.

[Math. 1]

$$\sigma = \frac{3 \times Pb \times Ls}{2 \times W \times T^2} \qquad \text{(Equation 1)}$$

It should be noted that Pb indicates the maximum load (N) when the test piece is broken.

EXAMPLE

Hereinafter, an example of inductor 100 based on the above embodiment will be described in detail with reference to FIG. 6. FIG. 6 is a diagram showing the relationship between the resin composition and the physical properties of the inductor according to the embodiment.

In this example, metal magnetic material powder 40 having an average particle size of 12 μm obtained by powdering an iron-silicon-chromium alloy having 3.3% by weight of silicon, 5.5% by weight of chromium, and the balance of iron by a gas atomization method was prepared. In addition, as resin 41, an adhesive silicone resin containing substantially the same amount of D unit and T unit was used for first resin 42, and a modified silicone resin containing T unit as a main component was used for second resin 43. Each test sample was prepared from the above materials according to the composition of FIG. 6 according to the method for producing magnetic core member 10 described in the embodiment. It should be noted that in the first column of FIG. 6, in addition to the sample number as No, "*" for distinguishing a comparative example is attached. For example, it is shown that the test sample of sample number 1 is a test sample according to the comparative example attached with "*".

The test samples of sample number 1 to sample number 4 were produced without mixing first resin 42. In addition, the test samples of sample number 1 to sample number 4 were produced by mixing 2.50% by weight, 2.80% by weight, 3.00% by weight, and 3.40% by weight of second resin 43, respectively.

The test samples of sample number 5 to sample number 9 were produced by mixing 0.50% by weight of first resin 42. In addition, the test samples of sample number 5 to sample number 9 were produced by mixing 2.50% by weight, 2.80% by weight, 3.00% by weight, 3.25% by weight, and 3.40% by weight of second resin 43, respectively. Therefore, in the test samples of sample number 5 to sample number 9, the total of first resin 42 and second resin 43 were 3.00% by weight, 3.30% by weight, 3.50% by weight, 3.75% by weight and 3.90% by weight, respectively.

The test samples of sample number 10 to sample number 14 were produced by mixing 0.10% by weight, 0.25% by weight, 1.00% by weight, 2.00% by weight, and 3.00% by weight of first resin 42, respectively. In addition, the test samples of sample number 10 to sample number 14 were produced by mixing 3.00% by weight of second resin 43. Therefore, in the test samples of sample number 10 to sample number 14, the total of first resin 42 and second resin 43 were 3.10% by weight, 3.25% by weight, 4.00% by weight, and 5.00% by weight and 6.00% by weight, respectively.

It should be noted that the mixing ratio of each resin is shown by the ratio of the mass of each resin to the mass of metal magnetic material powder 40 when the mass of metal magnetic material powder 40 is 100% by weight.

For each of the test samples according to the comparative example and the example produced above, the filling rate of metal magnetic material powder 40, magnetic permeability, Young's modulus, strength, and presence or absence of cracks were evaluated.

The presence or absence of cracks was evaluated by observing the surface of the magnetic core member for 10 inductors produced using each magnetic core member of the test samples. In producing the inductors here, a round conducting wire having a cross-sectional diameter of 0.65 mm was used as the conducting wire of coil member 20. A phosphor bronze plate having a thickness of 0.2 mm was used for first terminal member 30 and second terminal member 50. In addition, toluene was used as a solvent for kneading first resin 42 and second resin 43. In addition, the magnetic core member was produced by being pressure-molded at a pressure of 350 MPa, and heat-treating the obtained molded body for 120 minutes at a temperature of 180° C. to thermally cure resin 41. It should be noted that for the evaluation of cracks, the surface of the magnetic core member was observed with an optical microscope with a magnification of at least 10 times, and if all 10 inductors have no cracks, the test sample was designated as "OK", and if even one of the 10 inductors has cracks, it was designated as "NG".

For the evaluation of magnetic permeability, a toroidal core was produced with each composition of the test samples, a wire was wound around the toroidal core for 20 turns, and the magnetic permeability was measured under the condition of a frequency of 100 kHz using an LCR meter. The toroidal core was produced by being pressure-molded at a pressure of 350 MPa to a ring shape having an inner diameter of 10 mm, an outer diameter of 14 mm, and a thickness of 4 mm, and heat-treating the obtained molded body for 120 minutes at a temperature of 180° C. to thermally cure resin 41.

In deriving the filling rate of metal magnetic material powder 40, the mass of metal magnetic material powder 40 was calculated from the mass of the toroidal core and the mass ratio of metal magnetic material powder 40. Next, the volume of metal magnetic material powder 40 was calculated from the calculated mass of metal magnetic material powder 40 and the theoretical density based on the metal composition of metal magnetic material powder 40, and the ratio of the volume of the toroidal core and metal magnetic material powder 40 are calculated to calculate the filling rate.

The Young's modulus was measured by the nanoindentation method using a nanoindenter. The indenter with a material of diamond and a shape of Berkovich type was used. The Young's modulus of the indenter of 1141 GPa and Poisson's ratio of the indenter of 0.07 were used. In addition, Poisson's ratio of the sample of 0.25 was used. It should be noted that each sample was polished with alumina abrasives after flattening the top surface of the magnetic core member with #2000 sandpaper. In the measurement, the tip of the indenter was made abut against the cross section of metal magnetic material powder 40 and pushed in with a maximum load of 1000 Nm for measurement. The above was measured at 10 points for each test sample and evaluated by the average value.

For the measurement of the strength, test piece 60 was produced with each composition of the test sample, and the strength of test piece 60 was measured in the same manner as in the above embodiment. The test piece was produced by being pressure-molded at a pressure of 350 MPa to a flat plate shape having length L of 12 mm, width W of 12 mm, and thickness T of 0.7 mm, and heat-treating the obtained molded body for 120 minutes under a temperature condition of 180° C. to thermally cure resin 41. It should be noted that 10 test pieces 60 were produced for each test sample, the strength was measured for each, and the evaluation was performed by the average value of the measured values.

As shown in FIG. 6, it was confirmed that no cracks were generated in the magnetic core member in the test samples of sample number 4, sample number 6 to sample number 9, and sample number 11 to sample number 14. In other words, it was confirmed that cracks were generated in the magnetic core member in the test samples of sample number 1 to sample number 3, sample number 5, and sample number 10. It is presumed that since the amount of resin 41 (the total amount of first resin 42 and second resin 43) is small in the test samples of sample number 1 to sample number 3, sample number 5, and sample number 10, cracks have generated in the magnetic core member. It should be noted that the test samples of sample number 1 to sample number 3, sample number 5, and sample number 10 in which the generation of such cracks are confirmed are all test samples according to the comparative example.

The test samples of sample number 6 to sample number 9 and sample number 11 to sample number 13 contained first resin 42 and second resin 43, satisfied the filling rate of metal magnetic material powder 40 in the range of at least 73.5% by volume and at most 80.4% by volume, and obtained a high magnetic permeability of at least 23. In addition, in the test samples of sample number 6 to sample number 9 and sample number 11 to sample number 13, a low elastic modulus of 5.0 GPa to 10.5 GPa was confirmed in Young's modulus, and no cracks were generated in the magnetic core member. In this way, the test samples of sample number 6 to sample number 9 and sample number 11 to sample number 13 which show high magnetic permeability and do not have cracks generated are all test samples according to the example.

It is presumed that this is because the elasticity of first resin 42 functions as a plasticizer with respect to second resin 43, so that the fracture energy for causing cracks in the magnetic core member is increased. In addition, it is considered that since the elasticity of first resin 42 functions as a plasticizer with respect to second resin 43, even if the total amount of first resin 42 and second resin 43 increases, the decrease in the filling rate of metal magnetic material powder 40 and the magnetic permeability is suppressed. Accordingly, it is considered that the amount of resin 41 is increased to further suppress the generation of cracks, and the magnetic characteristics can be maintained high.

On the other hand, it is considered that in the test sample of sample number 4, although no cracks are generated in the magnetic core member, since first resin 42 is not contained, even if the amount of resin 41 is smaller than those of the test samples of sample number 6 to sample number 9 and sample number 11 to sample number 13, the influence of the decrease in the filling rate of metal magnetic material powder 40 and the magnetic permeability is large, and it is difficult to suppress the generation of cracks and achieve high magnetic properties at the same time. The test sample of this sample number 4 is a test sample according to a comparative example.

In addition, in the test sample of sample number 14, although no cracks are generated in the magnetic core member, the total amount of first resin 42 and second resin 43 is large, and the filling rate of metal magnetic material powder 40 and magnetic permeability are significantly lowered. The test sample of the sample number 14 is a test sample according to a comparative example.

As described above, in the test samples according to the example, magnetic core member 10 contains first resin 42 and second resin 43, and it was found that by setting the filling rate of metal magnetic material powder 40 to at least 73.5% by volume and at most 80.4% by volume and the Young's modulus to at least 5.0 GPa and at most 10.5 GPa, the generation of cracks in magnetic core member 10 could be suppressed, and the magnetic permeability could be maintained high to suppress the deterioration of magnetic properties.

In addition, in the test samples according to the example, values of strength of 21.4 $N/mm^2$ to 24.7 $N/mm^2$ were obtained.

Furthermore, it was found that by having a strength of at least 21.4 $N/mm^2$ and at most 25.0 $N/mm^2$, the generation of cracks in magnetic core member 10 could be suppressed, and the magnetic permeability could be maintained high to suppress the deterioration of magnetic properties.

In addition, in the test samples according to the example, resin 41 is composed of a plurality of silicone resins of first resin 42 and second resin 43. In addition, the test samples according to the example include an adhesive silicone resin with substantially the same amount of D unit and T unit like first resin 42. In addition, when the weight of metal magnetic material powder 40 is 100% by weight, the test samples according to the example contain the total amount of resins of first resin 42 and second resin 43 of 3.25% by weight to 5.00% by weight, of which first resin 42 of 0.25% by weight to 2.00% by weight is contained.

Accordingly, it was found that a filling rate of metal magnetic material powder 40 of at least 73.5% by volume and at most 80.4% by volume and a Young's modulus of at least 5.0 GPa and at most 10.5 GPa could be easily obtained.

[Effects, Etc.]

As described above, inductor 100 according to the present embodiment includes: magnetic core member 10 comprising metal magnetic material powder 40 and resin 41; and coil member 20 which is a conductor, and has one part embedded inside magnetic core member 10 and another part exposed outside magnetic core member 10, wherein magnetic core member 10 has: a filling rate of metal magnetic material powder 40 of at least 73.5% by volume and at most 80.4% by volume; and a Young's modulus of at least 5.0 GPa and at most 10.5 GPa.

In such inductor 100, magnetic core member 10 has a property of high elasticity while maintaining a high filling rate of metal magnetic material powder 40. The filling rate of metal magnetic material powder 40 is substantially proportional to the magnetic permeability of magnetic core member 10, and by maintaining the filling rate high, the magnetic permeability of configured magnetic core member 10 is maintained high. That is, magnetic core member 10 in inductor 100 is excellent in magnetic characteristics. In addition, since magnetic core member 10 has high elasticity, it is possible to suppress the generation of cracks in magnetic core member 10 due to an external force in the manufacturing process of inductor 100. Therefore, inductor 100 can suppress the generation of cracks and maintain a high magnetic permeability at the same time, and inductor 100 more suitable for use is realized.

In addition, for example, magnetic core member 10 may have a strength of at least 21.4 $N/mm^2$ and at most 25.0 $N/mm^2$.

According to this, magnetic core member 10 of inductor 100 has a strength of at least 21.4 $N/mm^2$ and at most 25.0 $N/mm^2$ in addition to high elasticity, so that the property of stickiness against deformation due to an external force is imparted, and the energy required to break magnetic core member 10 increases. Therefore, the effect of suppressing the generation of cracks in magnetic core member 10 is improved, and inductor 100 more suitable for use is realized.

In addition, for example, resin 41 may contain a silicone resin as a main component.

According to this, it is possible to form magnetic core member 10 that satisfies the ranges of the filling rate of metal magnetic material powder 40 and Young's modulus described above by using the silicone resin. Therefore, inductor 100 more suitable for use is realized by using the silicone resin.

In addition, for example, resin 41 contains a plurality of silicone resins, and out of the plurality of silicone resins, at least one silicone resin may be an adhesive silicone that contains a D unit and a T unit an amount of which is substantially the same as an amount of the D unit.

According to this, it is possible to form magnetic core member 10 that satisfies the ranges of the filling rate of metal magnetic material powder 40 and Young's modulus described above by using the adhesive silicone resin. Therefore, inductor 100 more suitable for use is realized by using the adhesive silicone resin.

Other Embodiments, Etc.

Although the inductor according to the embodiment of the present disclosure has been described above, the present disclosure is not limited to this embodiment.

For example, if the magnetic core member has a filling rate of the metal magnetic material powder of at least 73.5% by volume and at most 80.4% by volume and a Young's modulus of at least 5.0 GPa and at most 10.5 GPa, the strength is not limited to the range of at least 21.4 $N/mm^2$ and at most 25.0 $N/mm^2$. As long as the filling rate of the metal magnetic material powder and Young's modulus in the magnetic core member are within the above ranges, the inductor can suppress the generation of cracks and have high magnetic properties at the same time even if the magnetic core member has a strength outside the above range.

For example, if the magnetic core member has a filling rate of the metal magnetic material powder of at least 73.5% by volume and at most 80.4% by volume and a Young's modulus of at least 5.0 GPa and at most 10.5 GPa, it is not particularly limited to the material. As long as the filling rate of the metal magnetic material powder and Young's modulus in the magnetic core member are within the above ranges, the inductor can suppress the generation of cracks and have high magnetic properties at the same time even if the magnetic core member uses a material other than silicone resin as the main component.

In addition, for example, electronic equipment such as a power supply device equipped with the inductor described above is also included in the present disclosure.

In addition, the present disclosure is not limited to this embodiment. Forms obtained by making various modifications to the present embodiment that can be conceived by those skilled in the art, as well as other forms constructed by combining the components in the different embodiments, without departing from the spirit of the present disclosure, may also be included in the scope of one or more aspects.

INDUSTRIAL APPLICABILITY

The inductor according to the present disclosure is industrially useful as an inductor used in electronic equipment and the like.

The invention claimed is:

1. An inductor comprising:

a magnetic core member comprising metal magnetic material powder and resin; and a coil member which is a conductor, and has one part embedded inside the magnetic core member and an other part exposed outside the magnetic core member, wherein:

the magnetic core member has:

a filling rate of the metal magnetic material powder of at least 73.5 percent by volume and at most 80.4 percent by volume; and a Young's modulus of at least 7.8 GPa and at most 10.5 GPa, the resin contains a plurality of silicone resins as a main component, and out of the plurality of silicone resins, at least one silicone resin is an adhesive silicone containing a D unit and a T unit an amount of which is substantially same as an amount of the D unit.

2. The inductor according to claim 1, wherein the magnetic core member has a strength of at least 21.4 $N/mm^2$ and at most 25.0 $N/mm^2$.

* * * * *